US005376418A

United States Patent [19]

Rogers et al.

[11] Patent Number: 5,376,418

[45] Date of Patent: Dec. 27, 1994

[54] IMAGE PROTECTED PRESSURE SENSITIVE LABEL

[75] Inventors: Christopher J. Rogers, Hoffman Estates, Ill.; James H. Pagones, Slidell, La.

[73] Assignee: Uarco Incorporated, Barrington, Ill.

[21] Appl. No.: 121,360

[22] Filed: Sep. 13, 1993

[51] Int. Cl.$^{5}$ .............................................. B32B 9/00

[52] U.S. Cl. .......................................... 428/40; 428/41; 428/42; 428/343

[58] Field of Search ........................ 428/40, 41, 42, 343

[56] References Cited

U.S. PATENT DOCUMENTS 2,783,172 2/1957 Avery .................................. 428/41
3,153,868 10/1964 Jones .................................. 428/40
4,231,833 11/1980 Lieberman ............................ 428/41
4,914,842 4/1990 Lieberman ............................ 428/41
5,098,759 3/1992 Felix .................................. 428/40
5,103,583 4/1992 VanErmen ............................ 428/42

*Primary Examiner*—Patrick J. Ryan
*Assistant Examiner*—Kam Lee
*Attorney, Agent, or Firm*—Wood, Phillips, VanSanten, Hoffman & Ertel

[57] ABSTRACT

Smearing of indicia (30,36) or deterioration of a label may be eliminated in a label form that provides protection for the imaging (30,36) in a construction that includes a sheet of transparent face stock (12), a layer of transparent pressure sensitive adhesive (14) on one side of the stock sheet (12) and a sheet of transparent release liner (10) releasably adhered to the one side of the face stock sheet (12) by the adhesive (14). A die cut (18) is located in the release liner sheet (10) and defines a first removable frame section (20) and a second label defining section (22). The first section (20) surrounds the second section (22) so that when removed, a pattern of the adhesive (14) will be exposed. Reverse image printing (30) is disposed on the release liner second section (22).

7 Claims, 3 Drawing Sheets

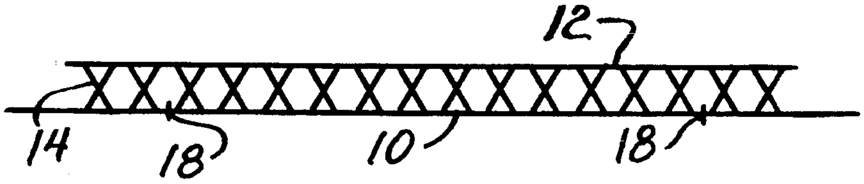
FIG. 2
FIG. 3
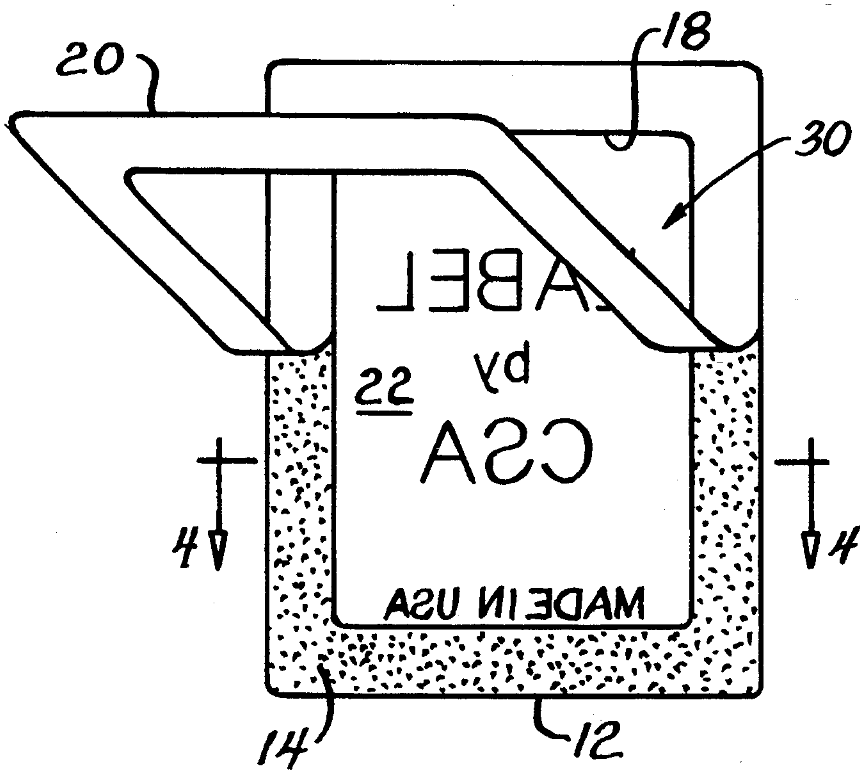
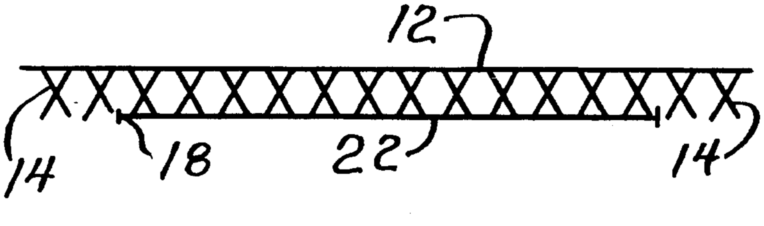
FIG. 4

IMAGE PROTECTED PRESSURE SENSITIVE LABEL

FIELD OF THE INVENTION

This invention relates to pressure sensitive labels, and more specifically, a pressure sensitive label wherein a protective layer or film is located over the imaging on the label to provide a measure of protection of the same from the environment.

BACKGROUND OF THE INVENTION

Pressure sensitive labels have found their way into all areas of life. They are used as badges or name tags at social gatherings or conventions as well as employed as labels on heavy machinery listing all sorts of operating characteristics and/or model information and the like.

Conventionally, a pressure sensitive label is made up of three components. A first is a sheet of face stock which may be virtually any type of imprintable material, but frequently will be paper or plastic. A second component is the so-called release liner sheet. The release liner sheet is typically a sheet of paper or plastic material having one side coated with a release material such as silicone or the like.

The third component is a pressure sensitive adhesive which is disposed between the face stock sheet and the release finer and which adheres the two together. The adhesive system and the face stock are selected so that the adhesive will always cling and adhere to the face stock while it will only releasably adhere to the silicone coated surface of the release liner.

Thus, in use, information to be conveyed is typically inscribed on the face stock, and specifically on the side thereof remote from the release liner. Once the label is to be installed, the release liner is grasped separately from the face stock and the two peeled apart. The separated face stock sheet, with the adhesive still clinging to one side thereof, is then applied, adhesive side first, to a substrate to which the label is to be mounted. The adhesive will adhere the face stock sheet, and thus the inscription on one side thereof to the desired substrate in such a way that typically it can only be removed through destruction of the face stock sheet.

In some instances, particularly when pressure sensitive labels are being employed on machinery or the like, it is desirable to protect the inscription on the label from the surrounding environment as, for example, moisture, lubricants, and the like. These environmental forces could, in many instances, cause deterioration and/or smearing of the information printed on the face stock. In some instances, particularly where the face stock is made of paper, and these environmental influences could cause deterioration of the face stock itself.

In cases such as mentioned immediately preceding, additional steps may be taken to protect the image on the label. Specifically, the label may be inscribed and placed on the substrate in the manner mentioned previously. At that point, then, a transparent overlay with adhesive on one side thereof and typically formed of a transparent plastic, will be installed over the label and adhered to the substrate around the periphery of the label so as to provide a generally sealed pocket of transparent material about the entirety of the label, the label being readable through the overlay material by reason of the transparency of the latter.

A number of problems accompany this technique. For one, if the overlay is not placed on the label properly, it may be wrinkled and thus of unpleasing appearance. More importantly, the wrinkles may represent defects in the peripheral seal about the pocket and allow moisture, lubricants, etc. to penetrate the pocket. Perhaps even more importantly, the application of the overlay represents an additional step in the labeling process. That, in turn, represents additional expense to the user of a labeling system requiting image protection.

Thus, there is a real need for a pressure sensitive labeling system that provides for image protection and without the need for the application of an overlay. The present invention is directed to meeting that need.

SUMMARY OF THE INVENTION

It is the principal object of the invention to provide a new and improved pressure sensitive label form for providing a label with a protected image. Another object of the invention is to provide an image protected, pressure sensitive label on a substrate.

Still another object of the invention is the provision of a method for making an image protected, pressure sensitive label.

According to one facet of the invention, a pressure sensitive label form for providing a label with protected imaging includes a sheet of transparent face stock provided with a layer of transparent pressure sensitive adhesive on one side thereof. A sheet of transparent release liner releasably adheres to the one side of the face stock sheet, the adherence being provided by the adhesive. A die cut is located in the release liner sheet and defines a first removable frame section and a second label defining section. The first section is in at least partial surrounding relation to the second section so that when removed, a pattern of the adhesive, in the partially surrounding relation to the second section, will be exposed. Reverse image printing is disposed on the release liner second section.

As a consequence of the foregoing, the first removable frame section may be removed and the label form, with the exposed adhesive, applied to a substrate. The printing on the image section will be visible through the transparent release liner, the transparent adhesive and the transparent face stock with one or the other or both of the release liner and the face stock providing protection for the image.

In one embodiment of the invention, the die cut is a closed die cut that extends peripherally around the entirety of the image receiving section.

Preferably, the die cut is rectangular.

In one form of the invention there are a plurality of the die cuts in the release liner with each defining one of the second, image receiving sections.

In a preferred embodiment, the face stock sheet, the adhesive and the release liner sheet are all substantially colorless.

According to another facet of the invention, an image protected, pressure sensitive label is provided which includes a substrate and a sheet of transparent face stock. Transparent pressure sensitive adhesive is disposed on one side of the face stock sheet and adheres the face stock sheet to the substrate. A section of transparent release liner is interposed between the substrate and the face stock sheet and adhered thereto by the adhesive. The size of the section of transparent release liner is less than the size of the face stock sheet. Reverse image indicia is located on the release liner section on the side thereof nearest the substrate which in turn is visible through the release liner section, the pressure sensitive adhesive and the face stock.

In a highly preferred embodiment, the face stock sheet and the release liner section are so sized and disposed with respect to each other that every boundary of the release liner section is spaced inwardly of the boundary of the space stock sheet to provide a pocket that is sealed about its periphery.

In a highly preferred embodiment, the face stock sheet is formed of a relatively impermeable plastic material.

According to still another facet of the invention, there is provided a method of making an image protected, pressure sensitive label. The method includes the steps of:

A) Providing a label form including a sheet of transparent release liner releasably adhered to a sheet of transparent face stock by a transparent adhesive;

B) Cutting the release liner inwardly of the periphery of the face stock sheet to define a removable section that, when removed, will expose the adhesive, and an adjacent image receiving section;

C) Inscribing reverse image indicia on the image receiving section of the release liner opposite of the face stock sheet;

D) Removing the removable section to expose the adhesive; and

E) Adhering the label to a substrate by the adhesive with the release liner section abutting the substrate.

In a preferred embodiment, step B), the step of cutting, is performed before step C), the step of inscribing indicia.

In one embodiment of the invention, the sheets are elongated plies and step B) is performed so as to define a plurality of the image receiving sections; and step C) is performed by inscribing variable information in the plurality of imaging receiving sections.

In one embodiment of the invention, the release liner sheet is an elongated ply and the face stock sheet comprises a plurality of coupons adhered to the ply along the length thereof. The method includes the step of forming transverse lines of weakening in the ply between the coupons thereon.

The invention contemplates that a step B) be performed by forming a plurality of rectangular die cuts in the release liner ply, one for each coupon, and in alignment with each of said coupon.

Other objects and advantages will become apparent from the following specification taken in connection with the accompanying drawings.

DESCRIPTION OF THE DRAWINGS

FIG. 2 is a schematic, sectional view taken approximately along the line 2—2 in FIG. 1;

FIG. 3 is a perspective view of a label form made according to the invention and illustrating the removal of a frame of a release liner to expose adhesive on the face stock;

FIG. 4 is an inverted, schematic sectional view taken approximately along the line 4—4 in FIG. 3;

DESCRIPTION OF THE PREFERRED EMBODIMENT

Figure 1:
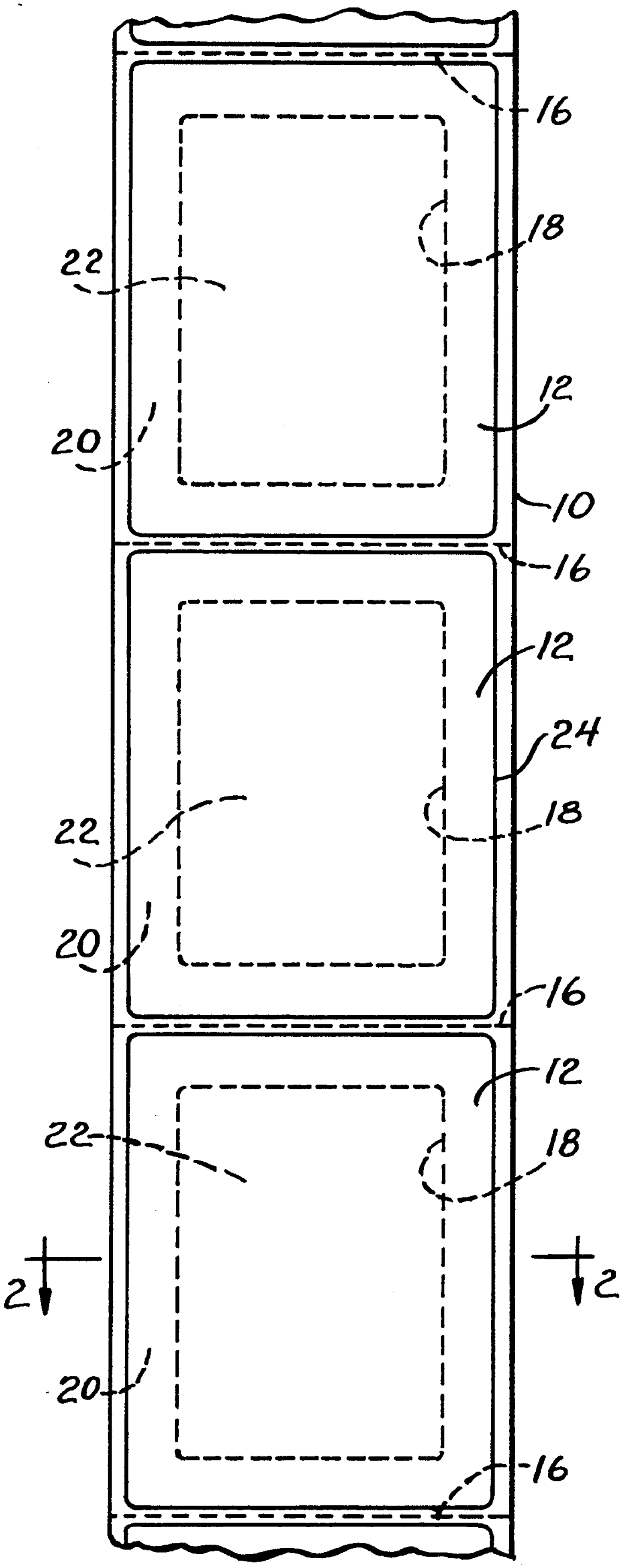
FIG. 1 is a plan view of a pressure sensitive label form made according to the invention.

An exemplary embodiment of a pressure sensitive label form for providing a label with protected imaging is illustrated in FIG. 1. With reference thereto, the same is seen to include an elongated ply 10 of release liner material, preferably formed of a relatively impermeable material such as plastic. As is well known, the release liner 10 will be coated with a waxy substance such as a silicone compound on one side thereof so that adhesive will releasably adhere thereto.

A series of rectangular coupons 12 are located in end-to-end relation and superimposed on the ply 10 along the length thereof as illustrated in FIG. 1. The coupons 12 are formed of a face stock material, also preferably impermeable and, on their sides abutting the ply 10, are coated with a layer of adhesive 14 (shown schematically by "X's" in FIG. 2). In the usual case, the coupons 12 will be formed from a single elongated ply (not shown) adhered to the ply 10. Die cutting in the ply of which the coupons 12 is formed to provide a ladder-like structure surrounding each of the coupons 12. This ladder-like structure of release liner material is then removed to yield the product illustrated in FIG. 1.

To provide for separation of the labels into individual units, transverse lines of weakening such as perforations 16 are located in the ply 10 between each of the coupons 12.

The ply 10, in alignment with each of the coupons 12, includes a rectangular die cut 18. It is important to note that the die cut 18 is located in the release liner ply 10 and not in the face stock defining the coupons 12.

According to the invention, the release liner ply 10, the face stock coupons 12, and the intervening adhesive 14 are all transparent. In a highly preferred embodiment, they are colorless as well, although in some instances, where a colored label is desired, the release liner ply 10 and/or the face stock coupons 12 and/or the adhesive 14 may be covered but again, they will nonetheless be transparent. To this and other ends of the invention, a polyester plastic may be used as both face stock and release liner material. Acrylar may also be used as face stock. The adhesive 14 may be on acrylic based adhesive or a rubber based acrylic adhesive. 3M-brand number 400 adhesive has been employed with success.

In FIG. 2, the edges of the die cut 18 are shown by vertical slashes and given the reference numeral 18. Each die cut 18 divides a part of the release liner ply 10 underlying a face stock coupon 12 into a first section 20 which is in at least partial surrounding relation to a second section 22. In a preferred embodiment, the first section 20 is a removable frame which is in completely surrounding relation to the second section 22 which in turn is an image receiving section. That is to say, the die cut 18 has its boundary, in a preferred embodiment, spaced within the boundary 24 of the corresponding coupon 12. This provides a rectangular frame of release liner material that may be grasped and separated from the face stock coupon 12, leaving the adhesive 14 adhered to the latter. The separation is illustrated in FIG. 3 with the frame or first section 20 partially removed from the remainder of the label.

It will be appreciated that the image receiving section of the release liner ply 10 remains in place as illustrated in FIG. 3.

Generally speaking, prior to the removal process, but conceivably afterwards, imaging is applied to the surface of the second section 22 remote from the coupons 12. As seen in FIG. 3, the imaging is reverse imaging, generally designated 30 and consists of the message "LABEL by CSA Made in USA".

Inverting the form from the position illustrated in FIG. 3 yields the schematic sectional view shown in FIG. 4. It will be appreciated that a rectangular pattern of adhesive 14 will be exposed about the entire periphery of the image receiving section 22 of the release liner ply 10.

Figure 5:
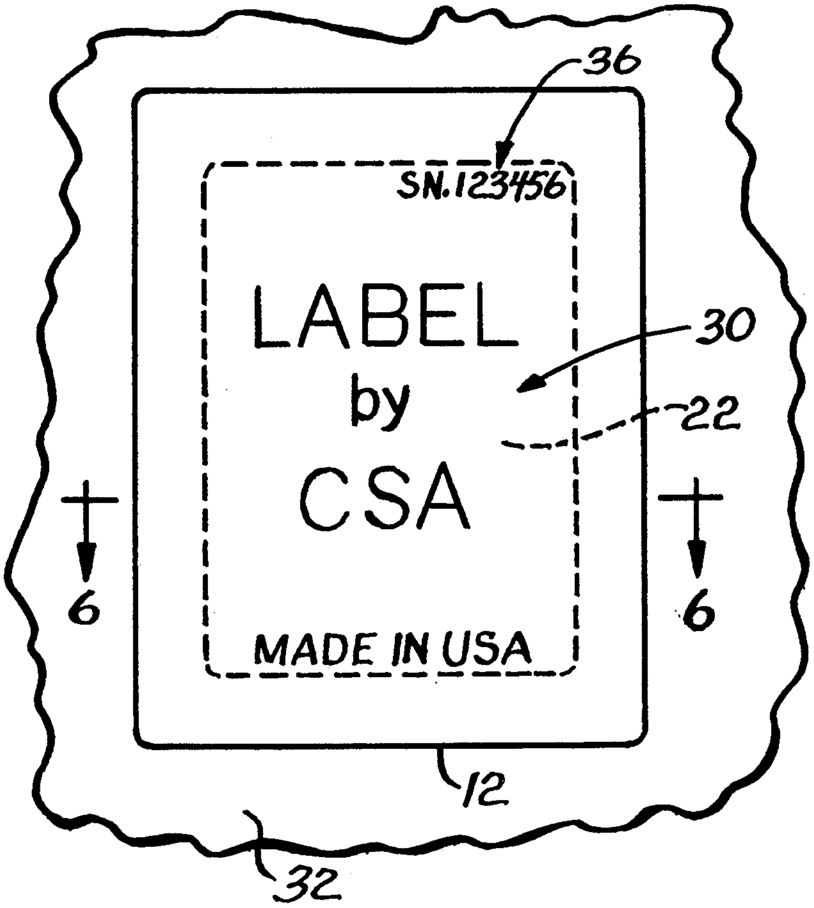
FIG. 5 is a plan view of the label applied to a substrate.
Figure 6:
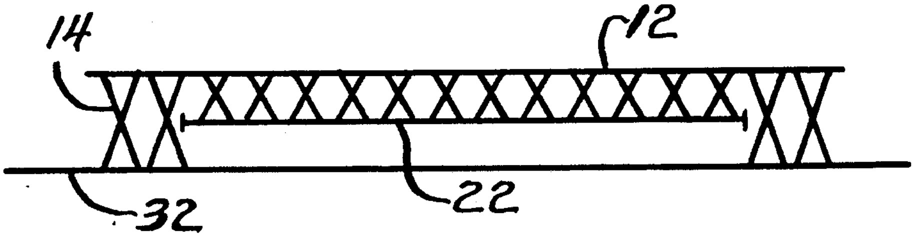
FIG. 6 is a schematic sectional view taken approximately along the line 6—6 in FIG. 5.

In use, with the removable section 20 removed and the imaging 30 in place, the label will then be applied to a clean substrate such as shown at 32 in FIGS. 5 and 6. The application is with the face stock coupon 12 uppermost, and with frame of adhesive 14 and the second, image receiving section 22 lowermost. The application of pressure will cause the frame of adhesive 14 to adhere to the substrate 32 and seal thereagainst about the entire periphery of the second, image receiving section 22. If desired, the removable section 20 could be configured so as to provide only two bands of adhesive, on opposite sides of the second section 22, a three sided U-shaped pattern of adhesive, or any other desired configuration. Of course, when the label is adhered to the substrate 32 by less than a completely closed pattern of the adhesive 14, a path of entry for environmental material is left which may not be desirable in many instances. On the other hand, in some instances it might be highly desirable in forming a pocket into which other materials might be inserted.

In any event, once the label is installed as illustrated in FIGS. 5 and 6, it will be appreciated that the side of the second, image receiving section 22 on which the indicia 30 was inscribed will be immediately abutting the substrate 32. Because the release liner ply 10, the face stock coupon 12 and the adhesive 14 are all transparent, the indicia 30 will be visible through all three and appear as illustrated in FIG. 5. That is to say, the indicia 30 will be visible by reason of the transparency of the material and the same will now appear in a regular or non-reversed form by reason of the fact that the indicia receiving side of the second section 22 is lowermost and was reverse image printed to begin with.

It can thus be appreciated that the imaging defining the indicia 30 is protected by both the face stock coupons 12 and the second section 22 of the release liner. Where a full and continuous pattern of adhesive as shown in FIG. 3 is employed, and where the face stock material defining the coupon 12 is a preferred, relatively impermeable plastic material, the indicia 30 will actually be sealed from the environment as well.

As mentioned previously, in a highly preferred embodiment, the transparent materials of which the label is made are also preferably colorless. Thus, when the label is applied to, for example, a metal substrate such as aluminum or stainless steel, the appearance of the substrate is visible through the label as well to provide a highly pleasing label construction.

Importantly, when the invention is made in continuous form subject to subsequent separation along the lines of weakening 16, a great deal of flexibility in label use is provided. For example, by using a computer controlled printer to provide the inscription of the indicia 30, variable information may be inscribed on each label, in whole or in part as the label form is fed through the printer. Thus, the indicia given the general reference numeral 30 in FIGS. 3 and 5 may remain fixed from one label to another while a serial number for a machine or the like, shown generally at 36 in FIG. 5, which would be different from each label to the next, could be printed thereon. Alternatively, the entirety of the indicia 30 on a label could be fixed information or as still another alternative, it could all be variable information, with no information being common from one label to the next.

In all events, use of the label made according to the invention eliminates the step of applying an overlay to a pressure sensitive label to achieve image protection. At the same time, since only one application step is required, and because the second section 22 of the release liner ply is always in place and gives stiffness to the label, wrinkling of the label during application as contrasted to wrinkling of an overlay, is far less likely to occur.

We claim:

1. A pressure sensitive label form for providing a label with protected imaging comprising:

a sheet of transparent face stock:

a layer of transparent pressure sensitive adhesive on one side of said face stock sheet;

a sheet of transparent release liner releasably adhered to said one side of said face stock sheet by said adhesive;

a die cut in said release liner sheet and defining a first removable frame section and a second label defining section, said first section being in at least partial surrounding relation to said second section so that when removed, a pattern of said adhesive in said partial surrounding relation to said second section will be exposed; and reverse image printing on said release liner second section.

2. The label form of claim 1 wherein said die cut is a closed die cut extending peripherally around the entirety of said second section.

3. The label form of claim 2 wherein said die cut is rectangular.

4. The label form of claim 2 wherein there are a plurality of said die cuts in said release liner, each defining one of said second sections.

5. The label form of claim 1 wherein said face stock sheet, said adhesive and said release liner sheet are substantially colorless.

6. An image protected, pressure sensitive label comprising:

a substrate:

a sheet of transparent face stock;

transparent pressure sensitive adhesive on one side of said face stock sheet and adhering said face stock sheet to said substrate;

a section of transparent release liner interposed between said substrate and said face stock sheet and adhered thereto by said adhesive, the size of said section being less than the size of said face stock sheet; and reverse image indicia on said section on the side thereof nearest said substrate.

7. The image protected, pressure sensitive label of claim 6 wherein said face stock sheet and said release liner sections are so sized and disposed with respect to each other that the boundary of said release liner section is spaced inwardly of the boundary of said face stock sheet.

* * * * *